Patented Sept. 11, 1928.

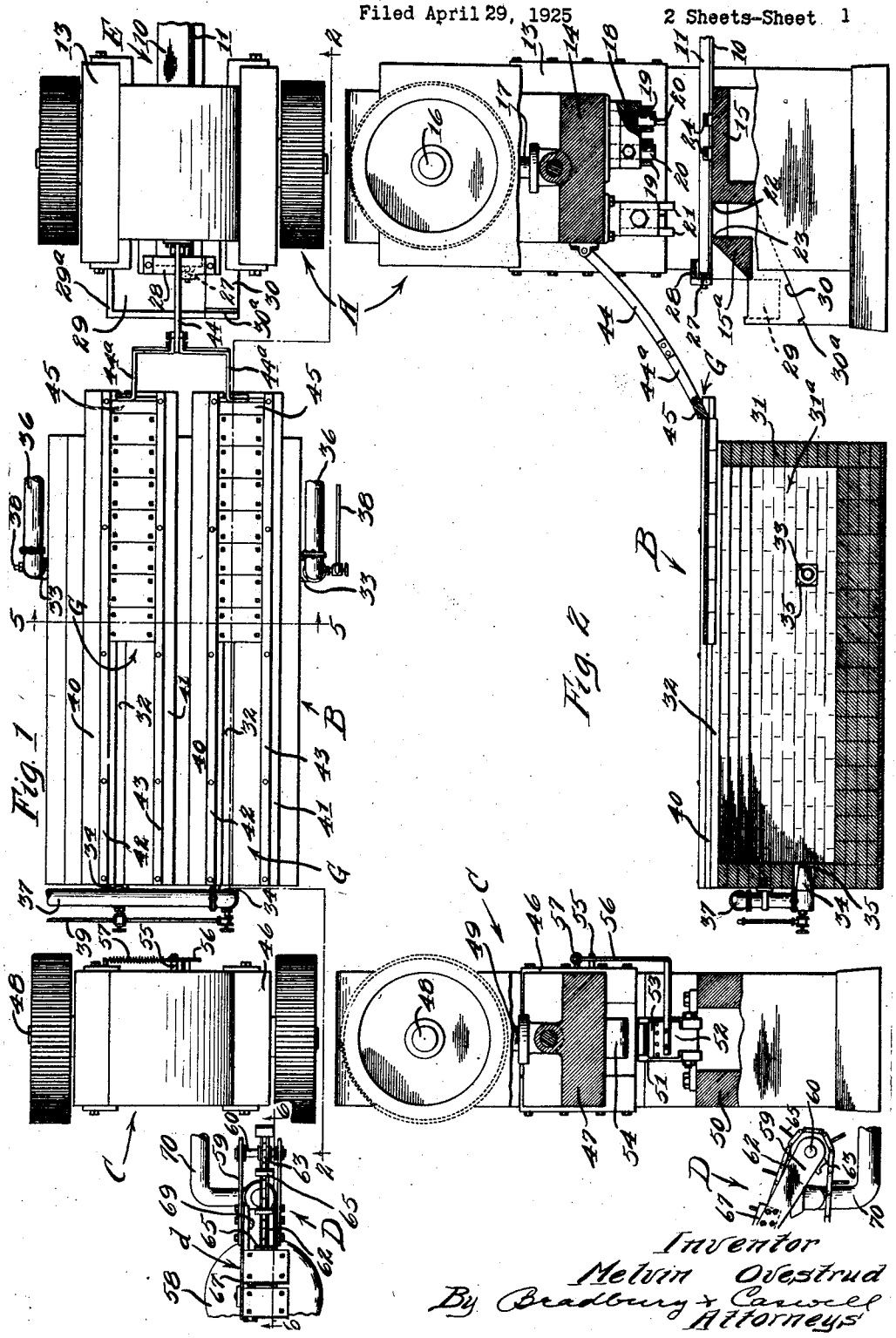
Sept. 11, 1928.
M. OVESTRUD
1,684,107
MEANS FOR AND METHOD OF FORMING TIE PLATES
Filed April 29, 1925  2 Sheets-Sheet 1
Inventor
Melvin Ovestrud
By Bradbury & Carwell
Attorneys

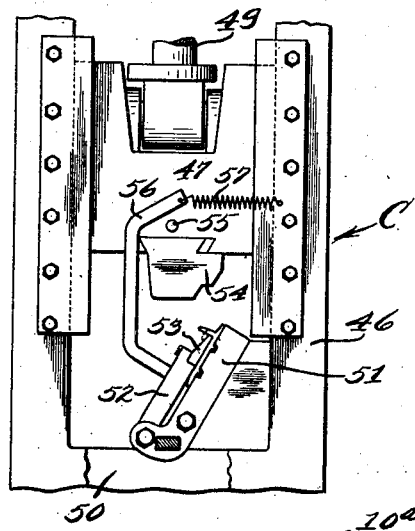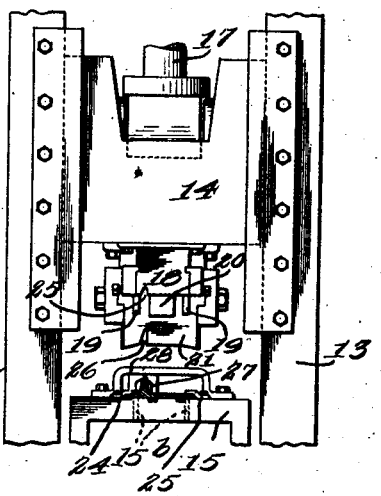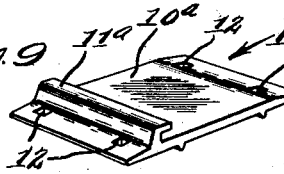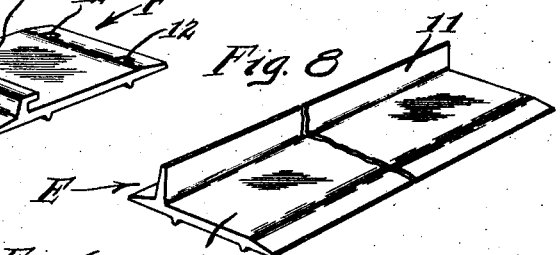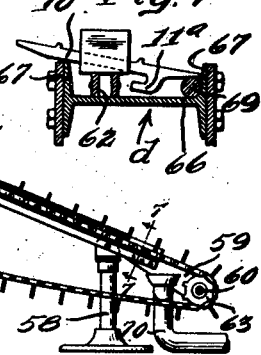

1,684,107

UNITED STATES PATENT OFFICE.

MELVIN OVESTRUD, OF STILLWATER, MINNESOTA, ASSIGNOR TO TWIN CITY FORGE & FOUNDRY COMPANY, OF STILLWATER, MINNESOTA, A CORPORATION OF MINNESOTA.

MEANS FOR AND METHOD OF FORMING TIE-PLATES.

Application filed April 29, 1925. Serial No. 26,671.

My invention relates to improvements in means for and method of forming tie-plates of the character set forth in Letters Patent of the United States No. 1,171,581 Feb. 16, 1916, to Edmund H. Barrett and which are known as the Barrett type combination tie-plate and rail anchor.

In tests, this tie plate has proven to be very effective and it has only remained to suply an efficient method and means for carrying out the same, whereby said tie-plates may be constructed at low enough cost to warrent the general use thereof.

An object of my present invention is to supply a method and means for carrying out the same, whereby tie-plates of the character set forth in said Barrett patent may be rapidly constructed in large quantities at relatively small cost.

More specifically it is my object to provide a method for forming tie-plates, which includes the taking of a long steel blank comprising a body plate having a perpendicular flange thereon extending longitudinally thereof; punching spike holes in said body, shearing punched portions from the blank to form tie-plate sections; heating the flanges on said sections; bending said heated flanges and thereby converting the flange of each section into a jaw member; conveying the formed tie-plate sections to point of disposition thereof and cooling the heated sections in the conveying step, said operations taking place in the order named, whereby tie-plates are formed rapidly and economically and immediately disposed of for shipment or storage.

Another object of the invention is to provide means for punching spike holes in the body of a steel blank and for shearing said blank transversely to provide severed tie-plate sections, also means for heating the flanges of the tie-plate sections, and means for bending the heated flanges into jaw forming relation, the heating means serving as a conveying medium between the blank shearing means and the flange binding means.

A further object is to provide a furnace for heating the flanges of tie-plates sections, wherein two sliding trains of said sections may be accommodated and, further, to provide a blank shearing device designed to deliver severed tie-plate sections adjacent to the head of each of said trains and to propel the trains of tie-plate sections through said furnace.

An additional object of the invention is to provide means for the immediate and convenient disposition of the formed tie-plate sections, said means comprising a tie-plate conveyor associated with said flange bending press and equipped to water cool the tie-plate sections carried upon said conveyor.

With the foregoing and other objects in view, which will appear in the following description, the invention resides in the novel combination and arrangement of parts and in the details of construction hereinafter described and claimed.

In the drawings, Fig. 1 is a plan view of means embodying my invention and adapted to carry out my improved method for forming tie-plate sections, the conveyor for disposing of the formed tie-plate sections being shown fragmentarily; Fig. 2 is a view partly in section and partly in elevation, the same being taken as on the line 2—2 of Fig. 1, portions of the mechanism shown in elevation being broken away to illustrate parts that otherwise would be concealed; Fig. 3 is a front elevational view, in detail, of a portion of the punching and shearing press; Fig. 4 is a front elevational view, in detail, of the flange forming press; Fig. 5 is a transverse sectional view of the furnace for heating the flanges of the tie-plate sections, said view being taken on the line 5—5 of Fig. 1; Fig. 6 is a longitudinal sectional view of the entire conveyor, which is illustrated only fragmentarily in plan in Fig. 1, said view being taken as on the line 6—6 of Fig. 1; Fig. 7 is a transverse sectional view in detail, the same being taken on the line 7—7 of Fig. 6; Fig. 8 is a perspective view of a steel blank from which the tie-plate sections are struck and Fig. 9 is a perspective view of a finished tie-plate.

Reference being had to the drawings, it will be noted that the illustrated embodiment of my invention includes a press A, furnace B, press C and conveyor D. Said elements arranged, one adjacent to another, provide a series of mechanisms through which tie-plate material is advanced from a stock pile to a car or bin for receiving the finished tie-plates.

The material at the stock pile is in the form of long bars or blanks, each blank E (Fig. 8) comprising an elongated body plate 10 having a flange 11 formed longitudinally thereof and perpendicular to said body plate. The finished tie-plate F (Fig. 9) comprises a section sheared transversely from a blank E, the platform $10^a$ thereof being a portion of the body plate 10 punched with spike holes 12 therein, the jaw member $11^a$ consisting of the flange portion bent inwardly of the platform $10^a$.

The press A, includes a frame 13, ram 14, bed 15, power crankshaft 16 and ram pitman 17, all common in conventional heavy duty presses. On the under side of the ram 14 near the front thereof is a punch head 18 in which are held two groups of punches 19, four to each group, and in which is mounted a pair of yielding bar holder plungers 20, one plunger being arranged centrally of one group of punches 19 and the other centrally of the second group of punches 19. Also secured to the under side of the ram 14 and at the rear of the punches 19 are a pair of shearing blades 21. The forward blade 21 co-operates with a cutting edge 22 on the bed 15, while the rear blade 21 co-operates with a cutting edge 23 on an added supplementary bed portion $15^a$. The punches 19 co-operate with the bed 15, openings $15^b$ (dotted lines, Fig. 3) being formed in said bed to receive said punches. Side guides 24 secured to the bed 15 and embracing the edges of a blank E fed to the press, locate the blank laterally of the press A so that the holes formed in the body plate 10 by the punches 19 will be properly located with respect to the flange 11 and so that flange receiving notches 25, 26 (Fig. 3) respectively formed in the punch head 18 and shearing blades 21 will receive said flange 11 on the working thrust of the ram 14. A rear stop 27 hung from a bracket 28 traversing the bed portion $15^a$ of the press A, provides an abutment against which the end of a blank E is fed during the upward stroke of the ram 14. On the downward or working thrust of the ram 14 two tie-plate sections (previously punched) are severed from the end of the blank E by the blades 21 and said blank is perforated further back by the punches 19, the punching being prepartory to the next shearing stroke of the blades 21, which is preceded by advancement of the blank to the stop 27 and the consequent placement of the punched portions thereof beneath the blades 21. The lowermost plate section severed from the blank topples rearwardly over the bed member $15^a$ into a chute 29. This chute 29, formed with a stop ledge $29^a$ leads said tie-plate section to the right of the press A (Fig. 1). The second tie-plate section, dropping between the cutting edges 22, 23 falls into a chute 30 formed with a stop ledge $30^a$ and arranged to deliver said second tie-plate section to the left of said press A.

The furnace B, extends rearwardly from the punching and shearing press A, the head of said furnace being disposed adjacent to said press A. The furnace comprises a body 31 of fire brick or other refractory material forming two spaced chambers $31^a$ extending longitudinally of the furnace structure. These chambers $31^a$ are vaulted, each opening through the top of the furnace body 31 in a narrow slot 32 reaching from end to end of said furnace. Forward and rear oil burner nozzles 33, 34 are provided, one of each for each chamber $31^a$, each nozzle being directed into its respective chamber through a horizontal opening 35 in the body 31 of the furnace. Communicating with these nozzles 33, 34 are pipes 36, 37 for air under pressure and also emptying into said nozzles are valved pipes 38, 39 for fuel oil. Mounted on top of the furnace body 31 and covering the opposite margins of each slot 32 in said body are a pair of spaced wearing plates 40, 41, fitted respectively with guide rails 42, 43, said plates and rails forming slide-ways G for tie-plate sections and being extended slightly beyond the head of the furnace as shown in Fig. 2. An inclined yoke 44 (Fig. 2) having its stem linked to the ram 14 of the press A is equipped at the tips of each of the branches $44^a$ with a pusher block 45, which sildes back and forth in one of the slide-ways G, as the ram 14 rises and falls. Tie-plate sections (Figs. 2 and 5) are placed in the slide-ways G of the furnace B with the body plate portions thereof resting face down on the wearing plates 40, 41 and with the flange portions depending in the slots 32 in the top of the furnace B. Upon the upward throw of the ram 14 of the press A, the pusher-blocks 45 are retracted from the last fed tie-plate sections of the two trains of said sections in the slide-ways G of the furnace. While said blocks 45 are so retracted the last severed tie-plate sections are passed to said slide-ways G, the one from the chute 29 of the press A being conveniently transferred to the adjacent slide-way G at one side of the furnace (Fig. 1) and the one from the chute 30 simlarly transferred to the slide-way G at the other side of the furnace. Upon the descent of the ram 14, the pusher blocks 45 engage the two tie-plate sections last fed to the slide-ways G, each pusher-block urging its respective train of tie-plate sections along the slideways G. From the foregoing, it will be understood that the step by step movement imparted by the yoke 44 to the trains of tie-plate sections on the furnace B makes room at the heads of the slide-ways G for new tie-plate sections as they are severed from a blank E at the press A and, further, that with the furnace of the furnace operating, the depending flange portions of the tie-plate sections will be heated in the travel of said sections from head to foot of said furnace.

The press C at the foot of the furnace B, includes a frame 46, a ram 47, power crankshaft 48, pitman 49 connecting said crankshaft with said ram and a bed 50, all common to ordinary heavy duty trip-presses. On the bed 50 of the press C is an anvil 51, the face thereof being inclined from the vertical about thirty degrees. Carried near the face of said anvil 51 on a hinged arm 52 is a spacer die 53, said anvil and die being substantially of the same width and corresponding in that dimension with the width of a tie-plate section. Taken from one of the slide-ways G of the furnace B, a tie-plate section is applied to the press C, the body plate portion being passed between the anvil 51 and spacer die 53 (Fig. 4) in such manner that the flange portion of the tie-plate section engages and overhangs the upper edge of the spacer die 53. A bending punch 54 carried on the under side of the ram 47 cooperates with the spacer die 53 and, upon the downward thrust of said ram 47, bends the heated flange portion of the tie-plate section over the spacer die 53. Upon the upward stroke of the ram 47, a pin 55 therein engages a cam lever 56, which is secured at its lower end to the arm 52. Through this lever and the arm 52, the spacer die 53 is moved away from the anvil 51 against the action of a spring 57 stretched between said lever 56 and frame 46. Free from the anvil 51, the formed tie-plate is lifted from the spacer die 53 and passed to the conveyor D.

Said conveyor D includes a body $d$ consisting of an I beam supported in inclined position on standards 58 with the flanges of said beam standing vertically. Projecting from the lower end of the body $d$ are brackets 59 in which an idler shaft 60 is journaled. And likewise, projected from the upper end of the body $d$ are brackets in which a power shaft 61 is journaled. An endless chain 62, pasing over sprockets 63, 64 respectively mounted on the shafts 60, 61 is provided at intervals with link extensions 65 reaching outward from the chain 62. The lower reach of the chain 62 hangs beneath the body $d$, while the upper reach thereof travels on the web 66 of said body $d$ near one of the flanges 67. Said web 66 of the body $d$, together with the portions of the flanges 67 rising from said web, form a trough into the upper end of which water is introduced through an elongated sprinkling nozzle 68. The formed tie-plates, taken from the press C are placed upon the conveyor D at the bottom thereof and in a manner best seen in Fig. 7, each tie-plate being dropped between chain link extensions 65, in inverted position, with one margin of the platform 10$^a$ riding the flange 67 nearest the chain 62 and the other margin of the platform riding a rail 69 arranged in the angle between the web 66 and the flange 67 opposite said first flange. In such position, the bent flange or jaw member 11$^a$ of a tie plate is submerged in the flow of water down the trough. Being moved upwardly along the body $d$ by the link extensions 65 with the jaw members 11$^a$ thereof dipped in water, decreasing in temperature toward the top of the conveyor, the tie-plates are cooled without being detrimentally hardened and finally ejected from the conveyor into a car, bin or other receptacle for receiving the same. A drain pipe 70, at the lower end of the conveyor D receives the water from the trough formed by the body $c$.

It will now be understood that in employing my improved method with the disclosed means for carrying out the same, tie-plates, cooled sufficiently to avoid danger of setting fire to the floors and walls of cars or bins, may be delivered promptly to such places after being rapidly and inexpensively formed from long rolled blanks.

Changes in the specific form of my invention, as herein disclosed, may be made within the scope of what is claimed without departing from the spirit of my invention.

Having described my invention, what I claim as new and desire to protect by Letters Patent is:

1. Means for forming tie-plates of the character described from a steel blank comprising an elongated body plate formed with a flange longitudinally thereof, said means including a press for punching spike holes in the body of said blank and shearing the blank transversely to sever punched sections therefrom, a furnace adapted to slidably receive a train of tie-plate sections and heat the flanges thereof, a second press for bending the heated flanges of the respective sections into jaw forming relation, said furnace constituting the conveying medium between said first and second presses, and means actuated by said first press for propelling tie-plate sections through said furnace.

2. Means for forming tie-plates of the character described from a steel blank comprising an elongated body plate formed with a flange longitudinally thereof, said means including a press adapted to punch spike holes in the body of said blank and shear the blank transversely to sever punched tie-plate sections therefrom, a furnace for heating the flanges of said tie-plate sections, and a second press for bending the flanges of said sections into jaw forming relation, said furnace providing dual conveying trains between said first and second presses and means on said first press adapted to deliver severed tie-plate sections adjacent to the head of each train.

3. Means for forming tie-plates of the character described from a steel blank comprising an elongated body plate formed with a flange longitudinally thereof, said means including a press for punching spike holes in the body of said blank and shearing the blank transversely to sever punched sections therefrom, a furnace for heating the flanges of the tie-plate sections, a second press for bending the heated flanges of said sections into jaw forming relation, said furnace constituting the conveying medium between said first and second presses, a conveyor for carrying the freshly formed tie-plates from said second press to point of disposition thereof, said conveyor being equipped with means for water cooling said tie-plates in transit on said conveyor.

4. Means for forming tie-plates of the character described from a steel blank comprising an elongated body plate formed with a flange longitudinally thereof, said means including a mechanism for punching spike holes in the body of said blank and shearing the blank transversely to sever punched sections therefrom, a furnace for heating the flanges only of the tie-plate sections sufficiently for the ready bending thereof, a second press for bending the heated flanges of the respective sections into jaw forming relation, said furnace constituting the conveying medium between said first and second presses.

5. The method of forming tie-plates of the character described, consisting in taking a steel blank comprising an elongated body plate formed with a flange longitudinally thereof, punching spike holes in the body, shearing said body transversely thereof to sever punched sections therefrom, heating the flanges only of said severed sections sufficiently for ready bending during transit thereof preparatory to the next step, bending the heated flanges of the respective sections into jaw forming relation, conveying the formed tie-plates to point of disposition thereof and water cooling said tie-plates in transit to such point.

6. The method forming tie-plates of the character described, consisting in taking a steel blank comprising an elongated body plate formed with a flange longitudinally thereof, punching spike holes in the body, shearing said body transversely thereof to sever punched sections therefrom, applying heat directly to the flanges only of said severed sections for heating the same sufficiently for ready bending, and bending the heated flanges on the respective sections into jaw forming relation.

7. A tie plate forming machine comprising a punch press including a bed and a ram for punching and shearing tie plate sections, a furnace positioned in proximity to said press having a guide along the upper portion thereof for guiding tie plate sections during the passage of the same along said furnace, said guideway being arranged to convey the tie plates in the same direction as the movement of said tie plates across said punch press bed, a feeder bar hingedly connected at one end to said ram and slidably mounted at its other end along said guideway, said feeder bar being adapted to simultaneously move the tie plates mounted on said guide way along said furnace upon reciprocation of said ram.

8. A tie plate forming machine comprising a punch press including a bed and a vertically reciprocable ram for punching and shearing tie plate sections, a furnace positioned in proximity to said press having a horizontally disposed guideway along the upper portion thereof for guiding tie plate sections during the passage of the same along said furnace, said guideway being arranged to convey the tie plates in the same direction as the movement of said tie plates across said punch press bed, an inclined feeder bar hingedly connected at one end to said ram at a point appreciably above the elevation of said guideway and slidably mounted at its other end along said guideway, said feeder bar being adapted to simultaneously move the tie plates mounted on said guideway along said furnace upon reciprocation of said ram, the weight of said feeder bar holding the same in contact with said guideway and causing the same to return along said guideway upon the upstroke of said ram.

In testimony whereof, I have signed my name to this specification.

MELVIN OVESTRUD.

CERTIFICATE OF CORRECTION.

Patent No. 1,684,107.  Granted September 11, 1928, to

MELVIN OVESTRUD.

It is hereby certified that the above numbered patent was erroneously issued to "Twin City Forge & Foundry Company," as assignee of the entire interest in said invention, whereas said patent should have been issued to the inventor said "Ovestrud and Twin City Forge & Foundry Company, of Stillwater, Minnesota, a Corporation of Minnesota", said corporation being assignee of one-half interest only in said invention as shown by the records of assignments in this office; and that the said Letters Patent should be read with this correction therein that the same may conform to the record of the case in the Patent Office.

Signed and sealed this 6th day of November, A. D. 1928.

(Seal)

M. J. Moore,
Acting Commissioner of Patents.